United States Patent [19]
Schurger et al.

[11] 3,941,434
[45] Mar. 2, 1976

[54] HYDROSTATIC BEARING

[75] Inventors: Rainer Schurger, Schwanfeld; Erich Burkl, Stammheim; Lothar Walter, Schweinfurt, all of Germany

[73] Assignee: SKF Industrial Trading and Development Company, B.V., Amsterdam, Netherlands

[22] Filed: Sept. 26, 1974

[21] Appl. No.: 509,322

[30] Foreign Application Priority Data
Oct. 13, 1973   Germany............................ 2351494

[52] U.S. Cl................................. 308/9; 308/122
[51] Int. Cl.² .......................................... F16C 1/24
[58] Field of Search ......... 308/9, 10, 7, 122, DIG. 1

[56]     References Cited
         UNITED STATES PATENTS
3,101,224   8/1963   Adams................................ 308/122
3,508,799   4/1970   Gordon............................... 308/122

Primary Examiner—M. Henson Wood, Jr.
Assistant Examiner—Gene A. Church

[57]     ABSTRACT

A hydrostatic bearing having a cylindrical sleeve in which a shaft is located. The inner surface of the sleeve is formed with a plurality of bearing compartments about its periphery separated by axial webs. Each web is provided with a recess forming a chamber running parallel to the axis of the sleeve and having a radial hole communicating therethrough. Each hole is connected in common to a source of bearing media under pressure.

5 Claims, 2 Drawing Figures

3,941,434

HYDROSTATIC BEARING

BACKGROUND OF THE INVENTION

The present invention relates to a hydrostatic bearing and in particular to a hydrostatic bearing for journalling shafts and the like having improved means for distributing the bearing media.

Hydrostatic bearings for absorbing radial loads are known in which a plurality of compartments are formed on the periphery of the inner surface of an annular cylindrical sleeve which is adapted to surround the shaft. The compartments are separated from each other by web-like portions of the housing so that they remain discreet and independent from each other. Proper operation of the bearing often requires that different compartments be provided with different degrees of pressurized media. As a result, in the known bearings, each compartment is formed to receive an independent supply of bearing or lubricant media by either separately providing each compartment with its own media pump, or by providing a common pump for all of the compartments and by simultaneously providing separate supply connections to each compartment in which special flow restriction devices are included. The flow restriction devices are arranged to counteract whatever pressure compensation occurs from the common source and to insure that each compartment is pressurized as required.

Conventionally, in those bearings having a common media source, a supply conduit extends through the housing into the center of each compartment and the flow restriction devices are in the form of capillary valves, diaphragm valves or other similar throttle means. As a result each compartment is in effect provided with its own source and pressure. It is of course intended that the intermediate webs between the adjoining compartments will prevent equalization of pressure between these compartments. However, this does not always occur and this objective is not entirely obtained since, in order to provide for the movement of the journalled shaft a small gap is formed between the shaft and the webs through which bearing media escapes. Experiments wherein the web has been widened, or its inner diameter decreased, so as to reduce the gap between it and the shaft have not furnished satisfactory results because the bearing compartments are reduced in size. These attempts have resulted, on the other hand, in increased friction, reduced load carrying capacity, and the diminishing of the length of operational life of the bearing.

The object of the present invention is to provide a hydrostatic radial bearing overcoming the defects and disadvantages of the prior art constructions.

It is another object of the present invention to provide a hydrostatic bearing in which pressure equalization between adjacent bearing compartments is prevented.

It is a further object of the present invention to provide a hydrostatic bearing which is simple in design and easily constructed.

It is still another object of the present invention to provide a hydrostatic bearing which has greater stability, rigidity of bearing response under radial loads and greater efficiency than those constructions heretofore known.

The foregoing objects, other objects, as well as the numerous advantages of the present invention will be seen in the following disclosure.

SUMMARY OF THE INVENTION

According to the present invention a hydrostatic bearing is provided having a cylindrical race sleeve on the inner surface of which a plurality of circumferentially spaced compartments are formed. The compartments are separated by axial webs. In each of two diametrically opposed webs there is provided a groove-like recess which runs parallel to the axis of the sleeve and forms a pressure chamber. A radial hole extends through the sleeve into each of the chambers and is connected to a source of bearing media under pressure.

Preferably both chambers are connected in common to a source of bearing media under pressure. This can be accomplished by employing a common source or by connecting the radial holes together to equalize their pressure. In the latter instance an annular groove on the exterior of the sleeve joining each of the holes, is preferred. Also, it is preferred that only two separating webs with pressure chambers are provided and that likewise the sleeve is provided with only a pair of compartments similar in shape and symmetrically arranged on the periphery of the sleeve.

Full details of the present invention are set forth in the following description and are shown in the accompanying drawings.

DESCRIPTION OF THE INVENTION

Figure 1:
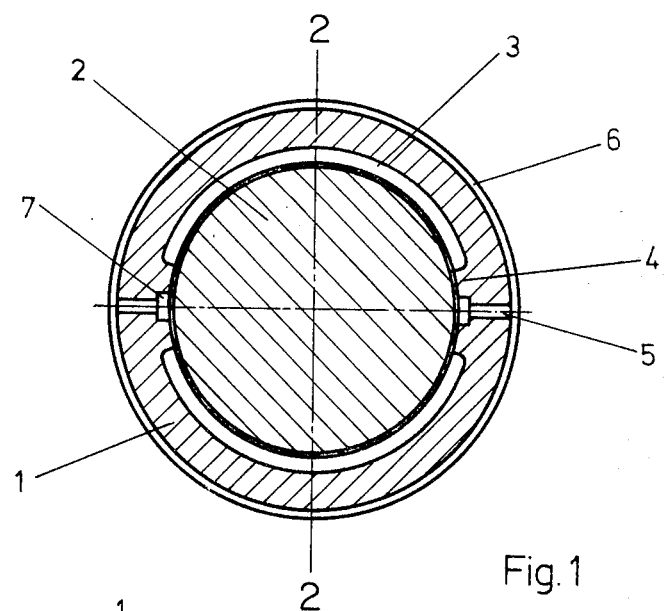
FIG. 1 is a sectional view taken transverse to the axis of a radial hydrostatic bearing embodying the present invention.
Figure 2:
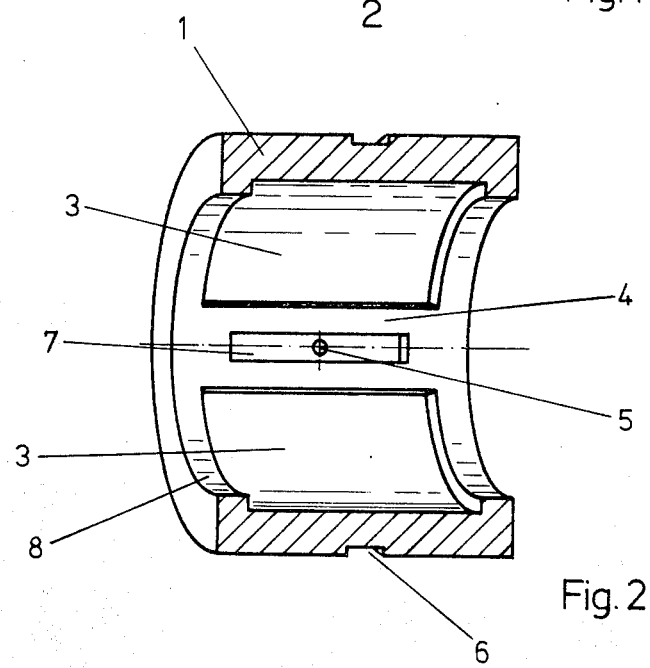
FIG. 2 is an isometric view of the bearing of FIG. 1 taken on line 2—2.

The radial bearing, as seen in FIG. 1, is formed of an outer cylindrical race sleeve 1 in which a shaft 2 is adapted to be journalled. The inner surface of the sleeve 1 is provided with a pair of uniformly symmetrically cut rectangular recesses forming bearing compartments 3, which are separated from each other by a pair of diametrically opposed strip-like axial webs 4. A radial supply hole 5 is drilled through the sleeve into the center of each of the webs 4 and an annular groove 6 is formed on the exterior surface of the sleeve 1 joining the holes. Each web 4 is cut out with a rectangular groove forming a pressure chamber 7 therein. The inner surface of the sleeve 1 is further provided with rims 8 on each of its axial edges.

The webs 4 and the rims 8 are integrally formed with the sleeve as a whole and preferably have the same inner radius which thus provides a uniform gap between the sleeve 1 and the shaft 2 for the flow of bearing media both circumferentially about the shaft as well as axially outward of its ends. The webs 4 as well as the pressure chambers 7 formed there in run parallel to the axis of the sleeve 1 which is adapted to seat within an outer housing or block in conventional manner.

In the embodiment shown bearing media, preferably a lubricant, is supplied to the annular groove from a common pump, to insure equal pressure delivery. The bearing media flows through each hole 5 into its communicating pressure chamber 7 without appreciable loss of pressure. From each chamber 7 the medium flows in the peripheral direction of the shaft circumferentially into each of the adjoining bearing compartments 3. Since the pressure in each chamber 7 is essentially that of the pump the pressure within the chamber is initially greater and is maintained greater than the pressure created in the adjacent compartments 3. Under radial load however one chamber 7 may have a greater prevailing pressure than that of the other chamber. When this occurs, medium flows from the chamber having the greater prevailing pressure through the gap between it and the shaft to each of the adjoining compartments 3 while the other chambers act as a throttle. The pressure in the throttled chamber is reduced until the bearing and the shaft are balanced. The reduction in pressure is at a maximum only to the level of the adjoining bearing compartments 3 and will not fall below the pressure of these compartments.

During operation, the pressure medium in each of the bearing compartments 3 is separated from that of the adjoining compartment by the existence of a greater pressure in each of the chambers 7 located in the separating webs. As a result equalization between the bearing compartments cannot take place. The bearing media, can only flow outwardly of the compartments 3 axially beyond the rims 8. The bearing media can thus not flow circumferentially from the compartments themselves. Since there is a constant relative movement between the shaft 2 and the sleeve 1, the chambers 7 and holes 5 as well as the gaps between the web 4 and the shaft are automatically self-cleanable and clogging and fouling of the bearing is eliminated.

The bearing seen in FIG. 1 can only be subjected to radial loads and stress in the plane denoted by the section line 2—2. Should installation of a shaft be made where stresses are created at right angles (i.e. in the radial direction of the webs) an identical bearing may be installed next to it in a position rotated by 90°. The source of bearing media can be supplied directly to each of the holes 5, either from a common pump or from a pair of pumps and in a manner where a common and equal pressure is obtained. The groove 6, equalizes the pressure between the holes 5. It may also be formed on the interior surface of the surrounding housing rather than on the sleeve itself. It will be obvious that as a result of the foregoing construction the media pressure in each of the separating chambers 7 can be maintained many times greater than the media pressure in each of the bearing compartments 3. This entirely prevents the circumferential escape of media or pressure equalization between the adjoining compartments. Consequently rigidity and load absorption of the bearing is greatly increased. The separating webs 4 assume the function of a flow throttle or valve and causes the bearing medium to flow through the chambers laterally, that is circumferentially about the shaft 2, to each of the adjacent bearing compartments supplying these compartments with a reduced pressure. A separate supply of bearing media to the bearing compartments 3 is thus not necessary.

A further advantage of the present invention lies in the fact that the throttling means created by the chamber 7 and the radial hole 5 are constantly self-cleaning due to the continuous relative movement between the sleeve and the journalled shaft. Thus the possibility of breakdown or faulty operation of the bearing is eliminated. The use of only two bearing compartments 3 and two diametrically opposed webs 4 results in the advantageous ability to vary the shape and size of the bearing compartments to obtain a desirable variation in bearing capacity, although maintaining a unidirectional load absorbing capacity. However, the number and shape of the bearing compartments as well as the webs can be modified as desired.

Various modifications and changes have been illustrated herein, others will be obvious to those skilled in the present art. It is intended therefore that the present disclosure be taken as illustrative only of the invention and not as limiting of its scope.

What is claimed is:

1. A hydrostatic radial bearing comprising a cylindrical sleeve, the inner surface of which is formed with at least one pair of compartments circumferentially spaced about its periphery, adjacent ones of said compartments being separated by an axial web, each of a pair of diametrically opposed webs having a chamber extending parallel to the axis of said sleeve and a hole extending radially through said sleeve communicating with its associated chamber for connection to a source of bearing media under pressure.

2. The bearing according to claim 1 wherein said compartments are circumferentially spaced symmetrically about the inner periphery of said sleeve and said webs extend parallel to the axis of said sleeve and integral with the periphery of said sleeve.

3. The bearing according to claim 1 including means for connecting said radial holes to a common source of lubricant under pressure.

4. The bearing according to claim 1 including an annular groove formed on the outer surface of said sleeve communicating with each of said holes.

5. The bearing according to claim 2 wherein said webs having a radius uniform with that of said inner surface.

* * * * *